United States Patent
Cho et al.

(10) Patent No.: US 8,671,189 B2
(45) Date of Patent: Mar. 11, 2014

(54) DYNAMIC LOAD BALANCING SYSTEM AND METHOD THEREOF

(75) Inventors: Jung Hyun Cho, Daejeon (KR); Hag Young Kim, Daejeon (KR); Ok Gee Min, Daejeon (KR); Chang Soo Kim, Daejeon (KR); Choon Seo Park, Daejeon (KR); Song Woo Sok, Daejeon (KR); Yong Ju Lee, Daejeon (KR); Jin Hwan Jeong, Seoul (KR); Joong Soo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 248 days.

(21) Appl. No.: 13/335,343

(22) Filed: Dec. 22, 2011

(65) Prior Publication Data

US 2012/0166630 A1 Jun. 28, 2012

(30) Foreign Application Priority Data

Dec. 23, 2010 (KR) .................. 10-2010-0134088

(51) Int. Cl.
*G06F 15/173* (2006.01)
*G06F 21/00* (2013.01)

(52) U.S. Cl.
USPC ........... 709/224; 709/226; 709/240; 709/203; 709/201; 709/205; 709/202; 709/206; 709/247; 709/223; 711/161; 711/162; 711/111; 711/150; 711/118; 726/4; 705/59; 705/77; 705/400; 717/177

(58) Field of Classification Search
USPC .......... 709/224, 226, 201–206, 223, 240, 247
See application file for complete search history.

(56) References Cited

U.S. PATENT DOCUMENTS

| 8,230,054 | B2 * | 7/2012 | Mutnuru et al. | 709/223 |
|---|---|---|---|---|
| 8,396,807 | B1 * | 3/2013 | Yemini et al. | 705/59 |
| 2009/0106571 | A1 * | 4/2009 | Low et al. | 713/310 |
| 2011/0022812 | A1 * | 1/2011 | van der Linden et al. | 711/163 |
| 2011/0107406 | A1 * | 5/2011 | Frost et al. | 726/6 |
| 2011/0321033 | A1 * | 12/2011 | Kelkar et al. | 717/174 |
| 2012/0059934 | A1 * | 3/2012 | Rafiq et al. | 709/225 |

FOREIGN PATENT DOCUMENTS

| KR | 1020100073155 | 7/2010 |
|---|---|---|
| KR | 10-0989490 | 10/2010 |

OTHER PUBLICATIONS

Banicescu, Ioana et al., "Design and implementation of a novel dynamic load balancing library for cluster computing," Parallel Computing, vol. 31:736-756 (2005).

* cited by examiner

*Primary Examiner* — Jude Jean Gilles
(74) *Attorney, Agent, or Firm* — Nelson Mullins Riley & Scarborough LLP; Anthony A. Laurentano, Esq.

(57) ABSTRACT

Disclosed is a dynamic load balancing system. The dynamic load balancing system includes a resource management master managing bare servers that do not execute services and having a hierarchical structure and a service master dynamically allocating the bare servers to a load balancing server or a service execution server or dynamically releasing the preallocated load balancing server or service execution server by the bare servers, in consideration of monitoring information on a state or performance of a server and service requirements to be provided.

19 Claims, 5 Drawing Sheets

DYNAMIC LOAD BALANCING SYSTEM AND METHOD THEREOF

CROSS-REFERENCE TO RELATED APPLICATIONS

This application claims priority to and the benefit of Korean Patent Application NO. 10-2010-0134088 filed in the Korean Intellectual Property Office on Dec. 23, 2010, the entire contents of which are incorporated herein by reference.

TECHNICAL FIELD

The present invention relates to a dynamic load balancing method and system, and more particularly, to a dynamic service management technology for securing performance while satisfying service requirements in a large-scale cluster computing environment.

BACKGROUND

Among service management methods, a static service management method is a method for providing a fixed server per service. Generally, the static service management method needs to drive enough servers so as to prepare for a load peak value.

However, the static service management method does not process work and returns a service failure to users, when loads requiring a larger number of servers than servers prepared for a system operation are generated. Further, the static service management method needs to wait for enough servers so as to prepare for a maximum load value, which results in wasting power in a general condition in which loads are not generated.

In addition, a technology for setting a server farm according to the related art may freely use resources within the server farm according to services, but may not be flexibly applied and may be a problem in regards to what reference the scale of the server farm is maintained, when a server larger than the server farm is requested.

Moreover, when the technology for setting a server farm individually manages all the resources and execution services in the large-scale cluster computer environment, the technology may have difficulty in management and increase a load of a management system.

SUMMARY

The present invention has been made in an effort to provide flexibility of service extension and facilitate service management by allocating extra servers to a load balancing server or a service server regardless of a type of service even in the case of managing services in a large-scale cluster computing environment.

Further, the present invention has been made in an effort to minimize a failure due to an overload of a server or a waste of resources due to a low load by sensing a service server load for service requirements in real time.

In addition, the present invention has been made in an effort to lessen a burden for a system scale by managing information on additional resources using a group master and a cluster master even when a scale of a system is increased.

An exemplary embodiment of the present invention provides a dynamic load balancing system, including: a resource management master that manages bare servers that do not execute services and has a hierarchical structure; and a service master that dynamically allocates the bare servers to a load balancing server or a service execution server or dynamically releases the pre-allocated load balancing server or service execution server by the bare servers, in consideration of monitoring information on a state or performance of a server and service requirements to be provided.

Another exemplary embodiment of the present invention provides a dynamic load balancing system, including: a load balancing server that balances loads in software or hardware; a service server that is connected to the load balancing server to provide services; a service monitoring unit that monitors a performance of the load balancing server and the service server and senses a failure thereof; a plurality of bare servers that do not execute the services; a resource management master that manages the plurality of bare servers in a hierarchical structure; a resource monitoring unit that monitors resource information of the plurality of bare servers; a service master that dynamically allocates the plurality of bare servers to the load balancing server or the service execution server or dynamically releases the pre-allocated load balancing server or service execution server based on the monitored results of the resource monitoring unit and the service monitoring unit; and a provisioning unit that stores and installs software of the services corresponding to the bare servers selected according to the selection of the service master.

Yet another exemplary embodiment of the present invention provides a dynamic load balancing method, including: inputting requirements of provided service; allocating bare servers to a load balancing server and a service server or releasing the pre-allocated load balancing server and service server by the bare servers, so as to distribute loads based on the inputted requirements and resource information; sensing loads of the service server; reallocating the service server based on the results sensed at the sensing of the loads when service performance is not satisfied and repeating the sensing of the loads; and sensing and providing a state of the load balancing server and the service server based on the results sensed at the sensing of the load when service performance is satisfied.

According to the exemplary embodiments of the present invention, it is possible to improve the efficiency of resource allocation and the performance of the system by proposing the method for hierarchically managing resources and services in the large-scale cluster computing system (system for executing other types of services) among the cluster computing systems.

Further, according to the exemplary embodiments of the present invention, it is possible to minimize the failure due to the overload of the server or the waste of resources due to the low load by sensing the service server load for the service requirements in real time.

In addition, according to the exemplary embodiments of the present invention, it is possible to lessen the burden for the system scale by managing the information on the additional resources using the group master and the cluster master even when the scale of the system is increased.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 1:
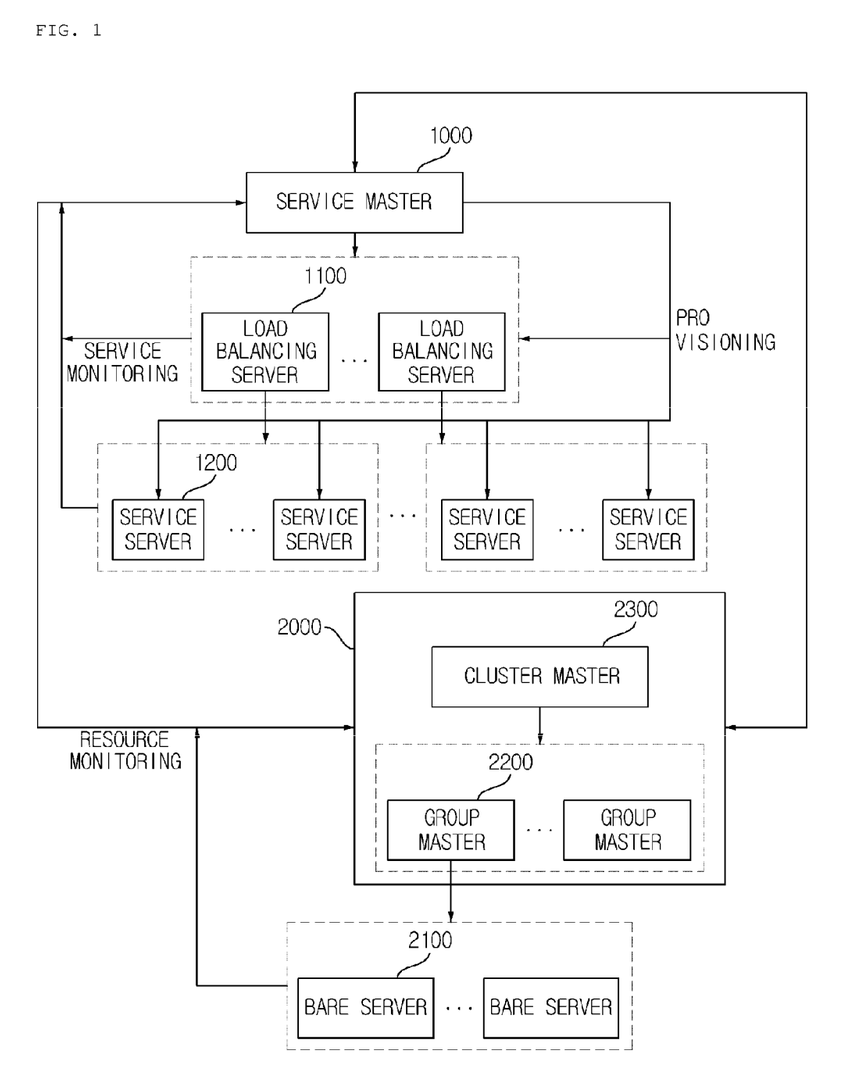
FIG. 1 is a block diagram showing a configuration of a dynamic load balancing system according to a first exemplary embodiment of the present invention.
Figure 2:
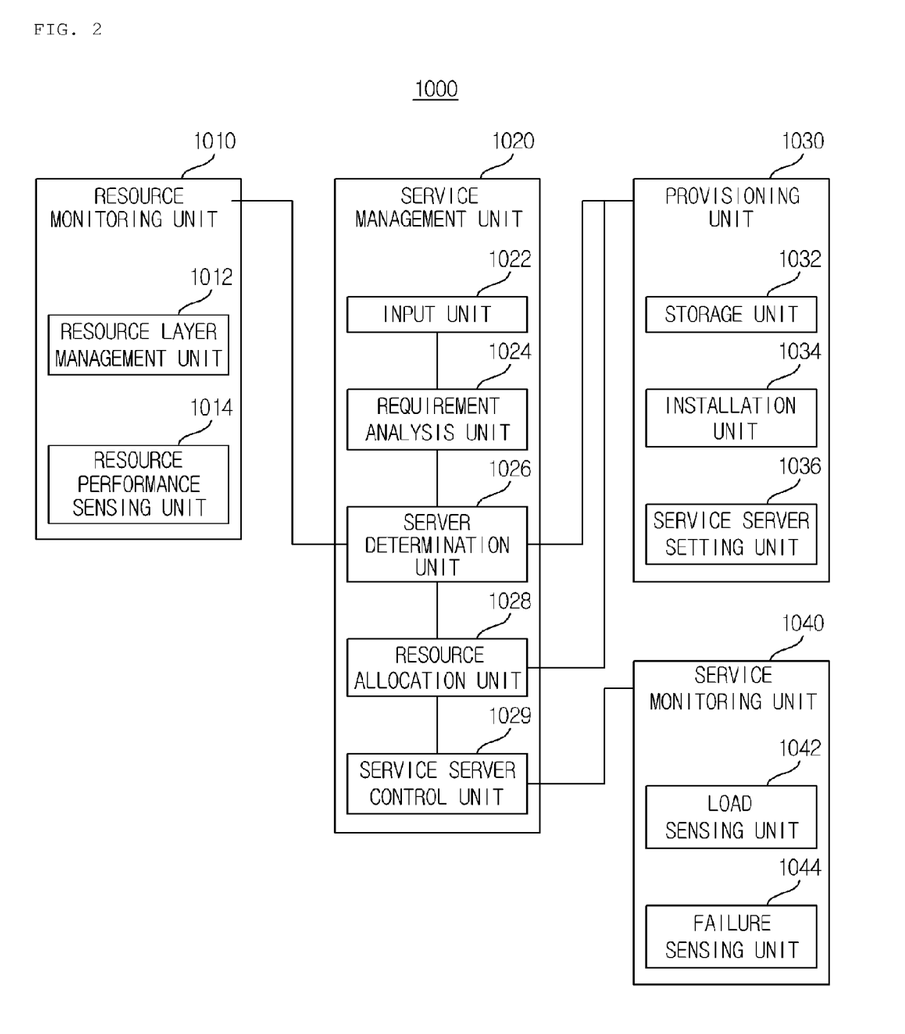
FIG. 2 is a block diagram showing a detailed configuration of a service master shown in FIG. 1.

FIG. 1 is a block diagram showing a configuration of a dynamic load balancing system according to a first exemplary embodiment of the present invention and FIG. 2 is a block diagram showing a detailed configuration of a service master shown in FIG. 1.

As shown in FIGS. 1 and 2, the dynamic load balancing system according to the first exemplary embodiment of the present invention includes a service master 1000 and a resource management master 2000.

The service master 1000 dynamically allocates bare servers 2100 to a load balancing server 1100 or a service execution server 1200 or dynamically releases the pre-allocated load balancing server 1100 or service execution server 1200 by the bare servers 2100, in consideration of monitoring information on a state or performance of a server and service requirements to be provided.

The load balancing server 1100 balances loads in software or hardware. Meanwhile, the load balancing server may be variously selected according to a system environment and service features.

The service server 1200 is connected to the load balancing server 1100 to provide services. Further, a plurality of service servers 1200 may be connected to a single load balancing server 1100.

In this case, the load balancing server 1100 and the service server 1200 are automatically provisioned according to commands of the service master 1000.

The service master 1000 includes a resource monitoring unit 1010, a service management unit 1020, a provisioning unit 1030, and a service monitoring unit 1040 and may monitor the load balancing server 1100 and the service server 1200 for requirements and performance of provided services and redistribute and merge the service servers based on the monitored results and resource information provided from the resource management master 2000.

The resource monitoring unit 1010 includes a resource layer management unit 1012 and a resource performance sensing unit 1014 and manages the resource information provided from the resource management master 2000.

The resource performance sensing unit 1014 monitors the performance of resource information of the bare servers 2100 and senses a failure thereof.

When the resource performance sensing unit 1014 senses the resource failure, the resource layer management unit 1012 may perform management so as not to allocate the corresponding resources to the load balancing server 1100 and the service server 1200 by excluding the corresponding resources.

The service management unit 1020 includes an input unit 1022, a requirement analysis unit 1024, a server determination unit 1026, a resource allocation unit 1028, and a service server control unit 1029 and receives requirements at the time of generating services and analyzes the received requirements so as to select the bare servers to be allocated to the load balancing server 1100 and the service server 1200.

The input unit 1022 may receive the requirements at the time of generating the services. In this case, the provided service requirements may be defined according to service policies and may include a service name, installation software, the minimum/maximum number of service servers, minimum/maximum performance requirements, and the number of service servers per load balancing server.

The requirement analysis unit 1024 analyzes the requirements input through the input unit 1022 and the server determination unit 1026 determines to allocate the bare servers to the load balancing server or the service server according to the analysis results of the requirement analysis unit 1024.

The resource allocation unit 1028 performs a control to allocate the resources to the corresponding server and execute automatic provisioning according to the determination of the server determination unit 1026 and the service server control unit 1029 controls an operation of the service monitoring unit 1040.

The provisioning unit 1030 includes a storage unit 1032, an installation unit 1034, and a service server setting unit 1036 and stores and installs software of the services corresponding to the bare servers selected according to the selection of the service management unit 1020.

The storage unit 1032 stores software corresponding to the provided services, the installation unit 1034 installs the software stored in the storage unit 1032 in the corresponding load balancing server 1100 and the service server 1200, and the service server setting unit 1036 controls the network environment setting of the service server 1200.

The service monitoring unit 1040 includes a load sensing unit 1042 and a failure sensing unit 1044, and monitors the performance of the load balancing server and the service server and senses the failure thereof.

The load sensing unit 1042 monitors the performance of the load balancing server 1100 and the service server 1200 to sense the overload or the low load and the failure sensing unit 1044 senses the failure of the load balancing server 1100 and the service server 1200.

When the load sensing unit 1042 senses the overload or the low load, the load sensing unit 1042 provides the sensed results to the service server control unit 1029.

The resource management master 2000 manages the plurality of bare servers 2100 that do not execute services and includes a hierarchical structure. That is, the resource management master 2000 includes a plurality of group masters 2200 that classify and manage the plurality of bare servers 2100 for each group and a cluster master 2300 that manages the plurality of group masters, thereby hierarchically managing the plurality of bare servers.

Figure 3:
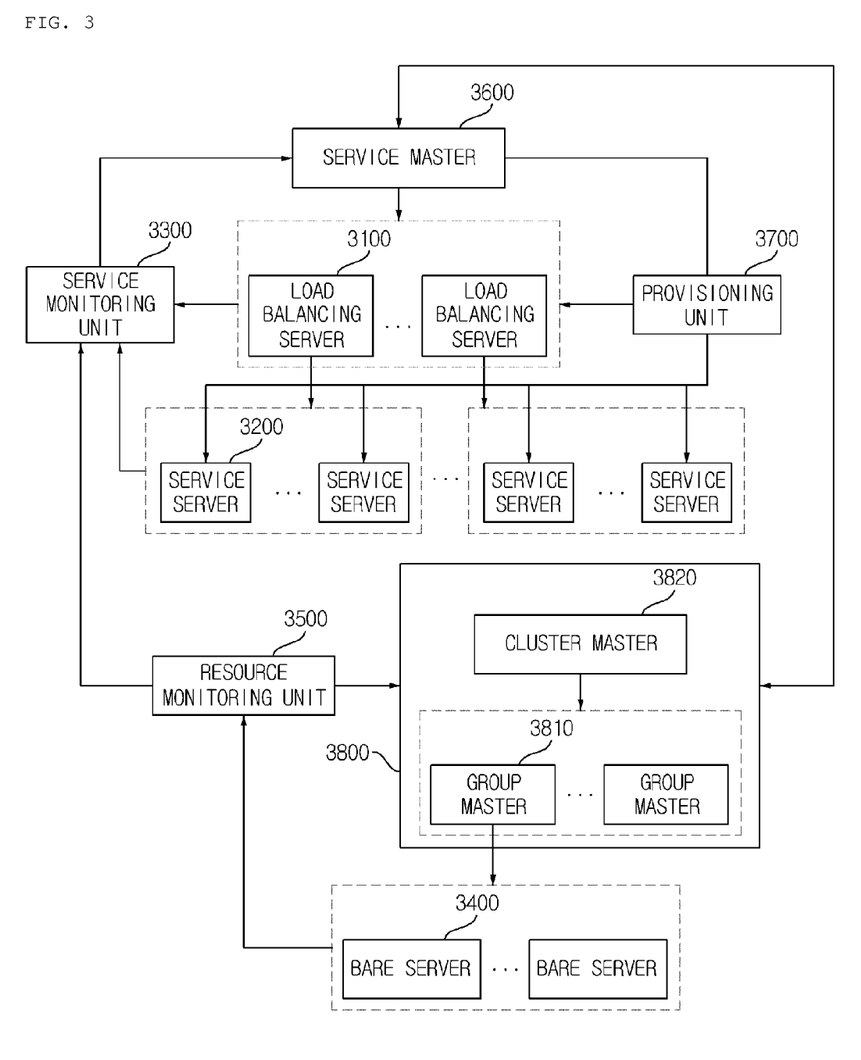
FIG. 3 is a block diagram showing a configuration of a dynamic load balancing system according to a second exemplary embodiment of the present invention.
Figure 4:
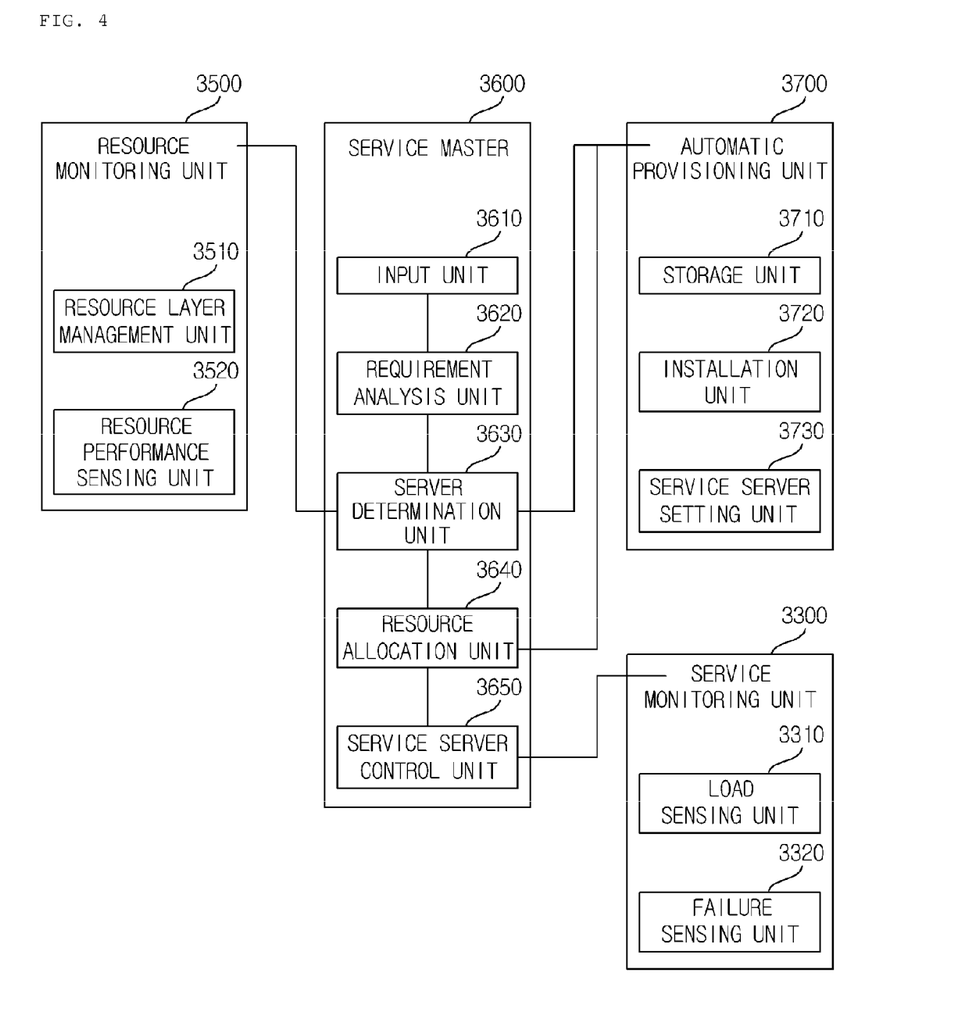
FIG. 4 is a block diagram showing a detailed configuration of a service master, a resource monitoring unit, a provisioning unit, and a service monitoring unit shown in FIG. 3.

The plurality of bare servers 2100 represent a server that is not allocated to the load balancing server 1100 or the service server 1200, that is, a server that does not execute services since software or environment setting is not yet made FIG. 3 is a block diagram showing a configuration of a dynamic load balancing system according to a second exemplary embodiment of the present invention and FIG. 4 is a block diagram showing a detailed configuration of a service master, a resource monitoring unit, a provisioning unit, and a service monitoring unit shown in FIG. 3.

Among the components shown FIGS. 3 and 4, the detailed description of components commonly shown in FIGS. 1 and 2 will be omitted.

As shown in FIGS. 3 and 4, the dynamic load balancing system according to the second exemplary embodiment of the present invention includes a load balancing server 3100, a service server 3200, a service monitoring unit 3300, bare servers 3400, a resource monitoring unit 3500, a service master 3600, a provisioning unit 3700, and a resource management master 3800.

The load balancing server 3100 balances loads in software or hardware and the service server 3200 is connected to the load balancing server 3100 to provide services.

The service monitoring unit 3300 includes a load sensing unit 3310 and a failure sensing unit 3320, and monitors the performance of the load balancing server 3100 and the service server 3200 and senses the failure thereof.

The load sensing unit 3310 monitors the performance of the load balancing server 3100 and the service server 3200 to sense the overload or the low load.

The failure sensing unit 3320 senses the failure of the load balancing server 3100 and the service server 3200. When the load sensing unit senses the overload or the low load, the failure sensing unit 3320 provides the sensed results to the service server control unit of the service master 3600.

The plurality of bare servers 3400 represent a server that does not execute services since the environment setting so as to allocate the plurality of bare servers to the load balancing server 3100 and the service server 3200 is not made.

The resource monitoring unit 3500 includes a resource layer management unit 3510 and a resource performance sensing unit 3520 and monitors the resource information of the plurality of bare servers 3400.

The resource performance sensing unit 3520 monitors the performance of the bare servers and senses the failure thereof.

When the resource performance sensing unit 3520 senses the resource failure, the resource layer management unit 3510 performs management so as not to allocate the corresponding resources to the load balancing server and the service server by excluding the corresponding resources.

The service master 3600 includes an input unit 3610, a requirement analysis unit 3620, a server determination unit 3630, a resource allocation unit 3640, and a service server control unit 3650 and redistributes and merges the service servers based on the monitored results of the resource monitoring unit 3500 and the service monitoring unit 3300.

The input unit 3610 may receive the requirements at the time of generating the services. The requirement analysis unit 3620 analyzes the requirements input through the input unit 3610.

The server determination unit 3630 determines to allocate the bare servers to the load balancing server 3100 or the service server 3200 according to the analysis results of the requirement analysis unit 3620.

The resource allocation unit 3640 performs a control to allocate the resources to the corresponding server and execute the automatic provisioning according to the determination of the server determination unit 3630.

The service server control unit 3650 controls the operation of the service monitoring unit 3300.

The provisioning unit 3700 includes a storage unit 3710, an installation unit 3720, and a service server setting unit 3730 and stores and installs software of the services corresponding to the bare servers selected according to the selection of the service master 3600.

In this case, the load balancing server 3100 and the service server 3200 are automatically provisioned according to commands of the service master.

The resource management master 3800 manages the plurality of bare servers 3400 that do not execute services and includes a hierarchical structure. That is, the resource management master 3800 includes a plurality of group masters 3810 that classify and manage the plurality of bare servers 3400 for each group and a cluster master 3820 that manages the plurality of group masters, thereby hierarchically managing the plurality of bare servers.

Figure 5:
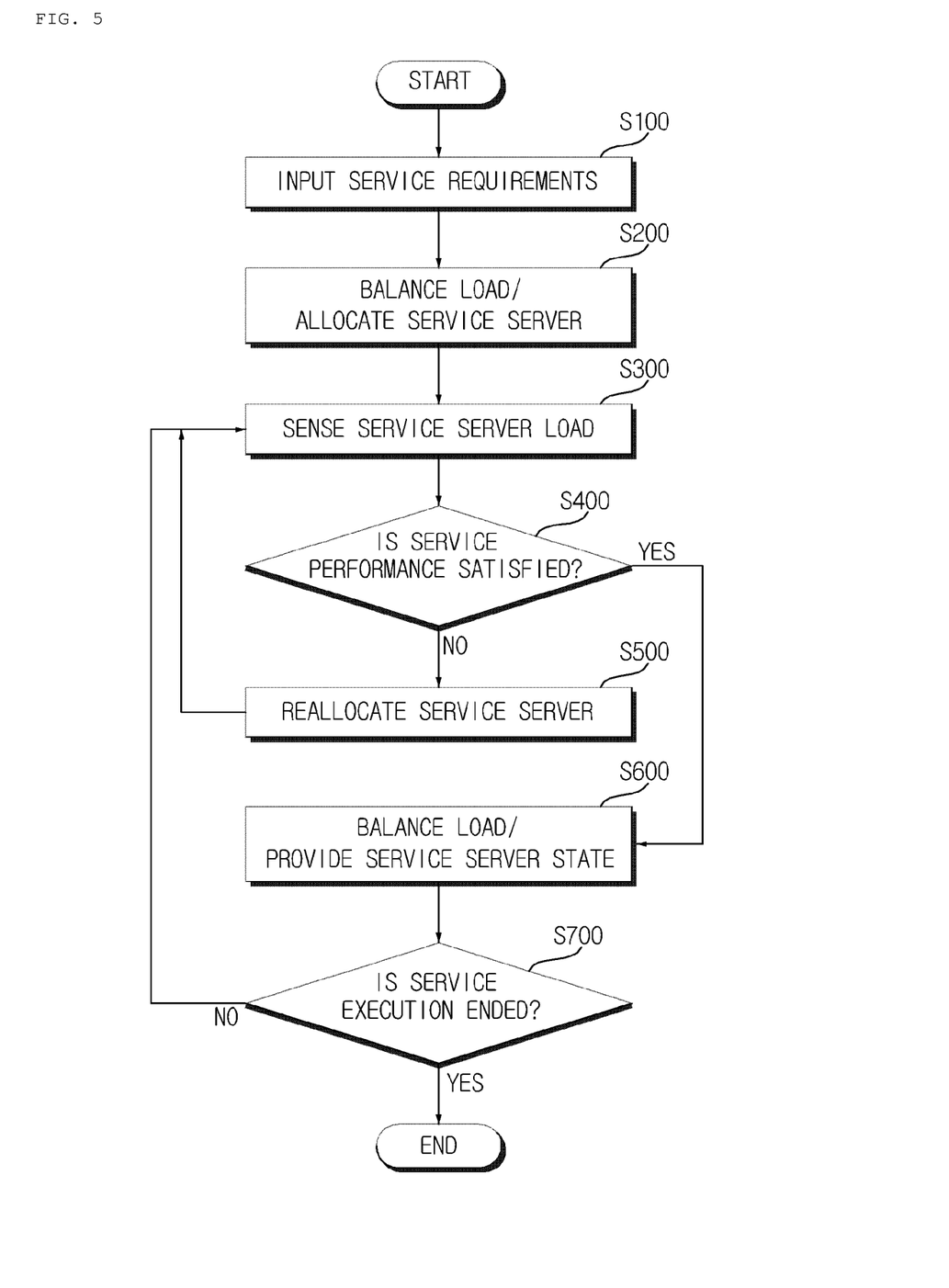
FIG. 5 is a flow chart showing a dynamic load balancing method according to the exemplary embodiment of the present invention.

Hereinafter, the dynamic load balancing method according to the exemplary embodiment of the present invention will be described with reference to FIG. 5. FIG. 5 is a flow chart showing a dynamic load balancing method according to the exemplary embodiment of the present invention.

As shown in FIG. 5, the dynamic load balancing method according to the exemplary embodiment of the present invention includes inputting requirements (S100), allocating a server (S200), sensing a load (S300), reallocating a server (S400), providing a server state (S500), and ending an execution (S600).

At the inputting of the requirements (S100), the dynamic load balancing system may receive the provided service requirements.

In this case, the provided service requirements may include a service name, installation software, the minimum/maximum number of service servers, minimum/maximum performance requirements, and the number of service servers per load balancing server.

At the allocating of the server (S200), the dynamic load balancing system allocates the bare servers to the load balancing server and the service server so as to distribute the load based on the requirements and the resource information that are input at the inputting of the requirements (S100) or releases the pre-allocated load balancing server and service server by the bare servers.

At the sensing of the load (S300), the dynamic load balancing system senses the load of the service server.

At the reallocating of the server (S400), the dynamic load balancing system reallocates the service server and repeats the sensing of the load based on the results sensed at the sensing of the load (S300) when the service performance is not satisfied.

At the providing of the server state (S500), the dynamic load balancing system senses and provides the state of the load balancing server and the service server based on the results sensed at the sensing of the load (S300) when the service performance is satisfied.

In this case, the dynamic load balancing system may periodically monitor and graph the state of the load balancing server and the service server so as to be provided to users.

At the ending of the execution (S600), the dynamic load balancing system repeatedly executes the sensing of the load (S300) and the reallocating of the server (S400) before the service execution ends and ends through the execution of the service ending.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A dynamic load balancing system balancing loads of a plurality of servers, the system comprising:
   a resource management master that manages bare servers that do not execute services and has a hierarchical structure; and
   a service master that dynamically allocates the bare servers to a load balancing server or a service execution server or dynamically releases the pre-allocated load balancing server or service execution server by the bare servers, in consideration of monitoring information on a state or performance of a server and service requirements to be provided.

2. The system of claim 1, wherein the load balancing server balances loads in software or hardware according to commands of the service master, the service server is connected to the load balancing server to execute services, and the load balancing server and the service server are automatically provisioned according to the commands of the service master.

3. The system of claim 1, wherein the service master includes:
   a resource monitoring unit that monitors resource information provided from the resource management master;
   a service management unit that receives requirements at the time of generating services and analyzes the received requirements so as to select the bare servers to be allocated to the load balancing server and the service server;
   a provisioning unit that stores and installs software of the services corresponding to the bare servers selected according to the selection of the service management unit; and
   a service monitoring unit that monitors a performance of the load balancing server and the service server and senses a failure thereof.

4. The system of claim 3, wherein the resource monitoring unit includes:
   a resource performance sensing unit that monitors a performance of resource information of the bare servers and senses a failure thereof; and
   a resource layer management unit that performs management so as not to allocate the corresponding resources to the load balancing server and the service server by excluding the corresponding resources, when the resource performance sensing unit senses the resource failure.

5. The system of claim 3, wherein the service management unit includes:
   an input unit that receives requirements at the time of generating services;
   a requirement analysis unit that analyzes requirements inputted through the input unit;
   a server determination unit that determines to allocate the bare servers to the load balancing server or the service server according to the analysis results of the requirement analysis unit;
   a resource allocation unit that performs a control to allocate the resources to the corresponding server and execute the automatic provisioning according to the determination of the server determination unit; and
   a service server control unit that controls an operation of the service monitoring unit.

6. The system of claim 3, wherein the provisioning unit includes:
   a storage unit that stores software corresponding to the services to be provided;
   an installation unit that installs the software stored in the storage unit in the load balancing server and the service server; and
   a service server setting unit that controls environment setting of the service server.

7. The system of claim 5, wherein the service monitoring unit includes:
   a load sensing unit that monitors the performance of the load balancing server and the service server to sense an overload or a low load; and
   a failure sensing unit that senses the failure of the load balancing server and the service server, the failure sensing unit providing the sensed results to the service server control unit, when the load sensing unit senses the overload or the low load.

8. The system of claim 1, wherein the resource management master includes:
   a plurality of group masters that classify and manage the plurality of bare servers for each group; and
   a cluster master that manages the plurality of group masters,
   wherein the resource management master hierarchically manages the plurality of bare servers using the plurality of group masters and the cluster master.

9. The system of claim 1, wherein the provided service requirements include a service name, installation software, the minimum/maximum number of service servers, minimum/maximum performance requirements, and the number of service servers per load balancing server.

10. A dynamic load balancing system, comprising:
    a load balancing server that balances loads in software or hardware;
    a service server that is connected to the load balancing server to provide services;
    a service monitoring unit that monitors a performance of the load balancing server and the service server and senses a failure thereof;
    a plurality of bare servers that do not execute the services;

a resource management master that manages the plurality of bare servers in a hierarchical structure;

a resource monitoring unit that monitors resource information of the plurality of bare servers;

a service master that dynamically allocates the plurality of bare servers to the load balancing server or the service execution server or dynamically releases the pre-allocated load balancing server or service execution server based on the monitored results of the resource monitoring unit and the service monitoring unit; and a provisioning unit that stores and installs software of the services corresponding to the bare servers selected according to the selection of the service master.

11. The system of claim 10, wherein the resource monitoring unit includes:

a resource performance sensing unit that monitors a performance of resource information of the bare servers and senses a failure thereof; and a resource layer management unit that performs management so as not to allocate the corresponding resources to the load balancing server and the service server by excluding the corresponding resources, when the resource performance sensing unit senses the resource failure.

12. The system of claim 10, wherein the service master includes:

an input unit that receives requirements of the services at the time of generating services;

a requirement analysis unit that analyzes requirements input through the input unit;

a server determination unit that determines to allocate the bare servers to the load balancing server or the service server according to the analysis results of the requirement analysis unit;

a resource allocation unit that performs a control to allocate the resources to the corresponding server and execute the automatic provisioning according to the determination of the server determination unit; and a service server control unit that controls an operation of the service monitoring unit.

13. The system of claim 12, wherein the provided service requirements include a service name, installation software, the minimum/maximum number of service servers, minimum/maximum performance requirements, and the number of service servers per load balancing server.

14. The system of claim 10, wherein the provisioning unit includes:

a storage unit that stores software corresponding to the services to be provided;

an installation unit that installs the software stored in the storage unit in the load balancing server and the service server; and a service server setting unit that controls environment setting of the service server.

15. The system of claim 10, wherein the service monitoring unit includes:

a load sensing unit that monitors the performance of the load balancing server and the service server to sense an overload or a low load; and a failure sensing unit that senses the failure of the load balancing server and the service server, the failure sensing unit providing the sensed results to the service server control unit, when the load sensing unit senses the overload or the low load.

16. The system of claim 10, wherein the resource management master includes:

a plurality of group masters that classify and manage the plurality of bare servers for each group; and a cluster master that manages the plurality of group masters, wherein the resource management master hierarchically manages the plurality of bare servers using the plurality of group masters and the cluster master.

17. A dynamic load balancing method, comprising:

inputting requirements of provided service;

allocating bare servers to a load balancing server and a service server or releasing the pre-allocated load balancing server and service server by the bare servers, so as to distribute loads based on the inputted requirements and resource information;

sensing loads of the service server;

reallocating the service server based on the results sensed at the sensing of the loads when service performance is not satisfied and repeating the sensing of the loads; and sensing and providing a state of the load balancing server and the service server based on the results sensed at the sensing of the load when service performance is satisfied.

18. The method of claim 17, wherein the requirements include a service name, installation software, the minimum/maximum number of service servers, minimum/maximum performance requirements, the number of service servers per load balancing server.

19. The method of claim 17, wherein the providing periodically monitors and graphs the state of the load balancing server and the service server provides the state of the load balancing server and the service server to users.

* * * * *